Sept. 5, 1933.  T. J. HARLEY  1,925,636
MAGNETIC ROTOR
Filed Dec. 9, 1930  2 Sheets-Sheet 1
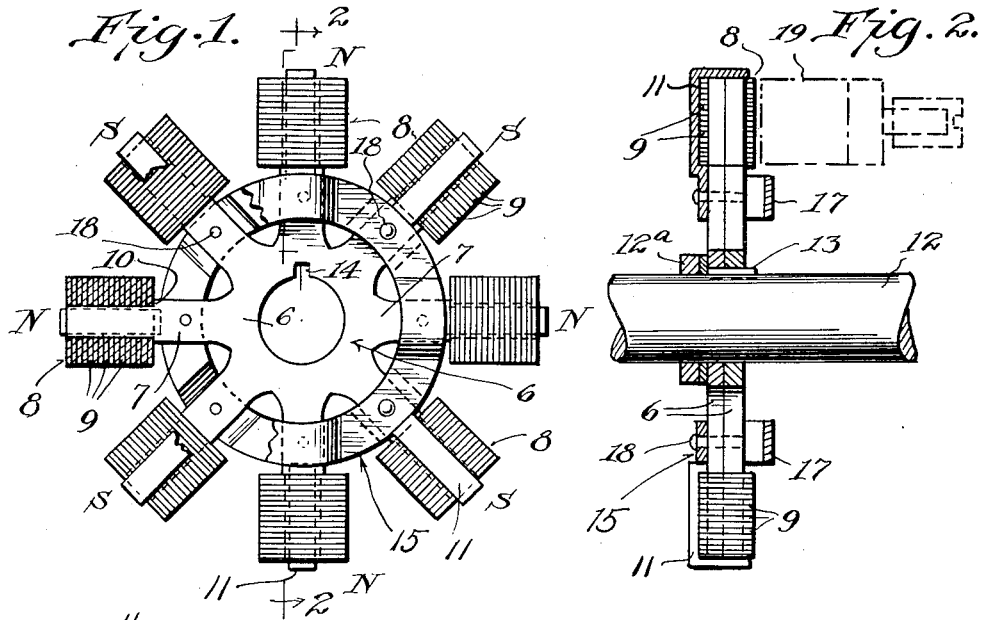
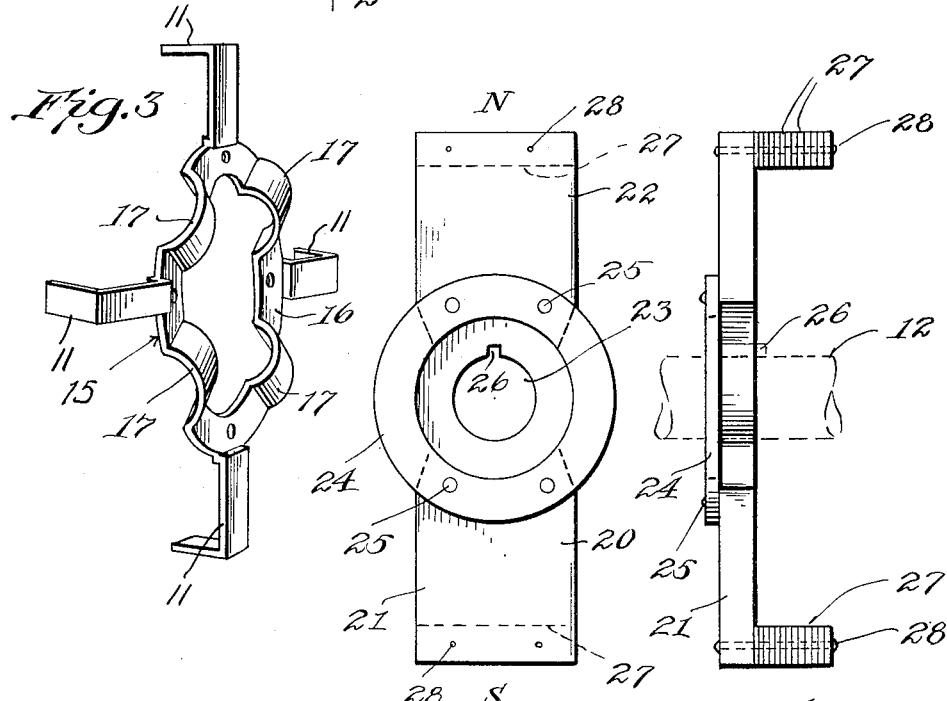
Inventor
T. J. Harley
By
Eccleston & Eccleston
Attorney Sept. 5, 1933.   T. J. HARLEY   1,925,636
MAGNETIC ROTOR
Filed Dec. 9, 1930   2 Sheets-Sheet 2

Inventor
T. J. Harley
By
Eccleston & Eccleston
Attorneys

Patented Sept. 5, 1933

1,925,636

UNITED STATES PATENT OFFICE 1,925,636

MAGNETIC ROTOR

Thomas J. Harley, Chicago, Ill.

Application December 9, 1930. Serial No. 501,097

3 Claims. (Cl. 171—252)

My invention relates to magnetic rotors and particularly to rotors for dynamo-electric machines, ignition apparatus and other electrical devices.

One object of my invention is to provide a rotor made up of magnetic punchings or of rolled stock, the construction being such that the magnet strength may be made of any desired value by varying the number of punchings employed in the assembly.

Another object of the invention is to provide a rotor which may be constructed with any number of poles, the number of poles being determined by the type of punching employed.

Still another object is to produce a rotor in which non-magnetic end plates are unnecessary, and at the same time one which is light in weight and can be constructed at small cost.

A further object of the invention is to produce a rotor which can be assembled on the end of a shaft without the necessity of providing an extra bearing or housing.

Further objects and advantages of the invention will appear from the following description when read in conjunction with the accompanying drawings, wherein Figure 1 is a side view of a multipolar rotor constructed in accordance with my invention.

Figure 2 is a sectional view on line 2—2 of Figure 1, a stator also being shown.

Figure 3 is a perspective view of a supporting ring employed in the rotor.

Figure 4 is a back view of a two-pole rotor embodying my invention.

Figure 5 is a side view of the rotor shown in Figure 4.

Figure 6:
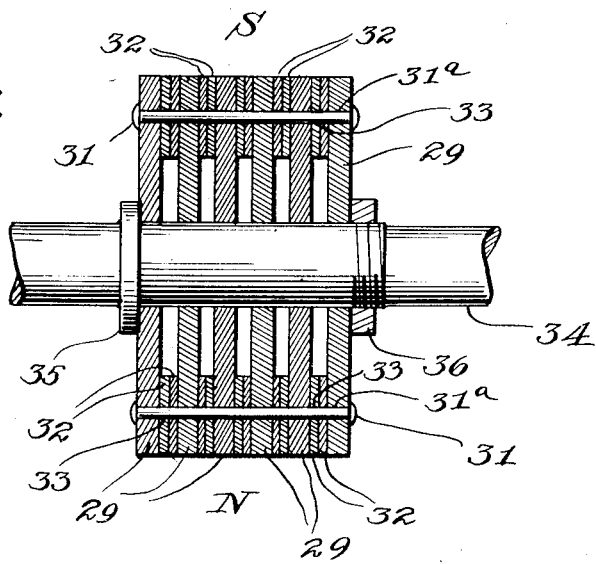
Figure 6 is a sectional view of a modified form of two-pole rotor construction.
Figure 7:
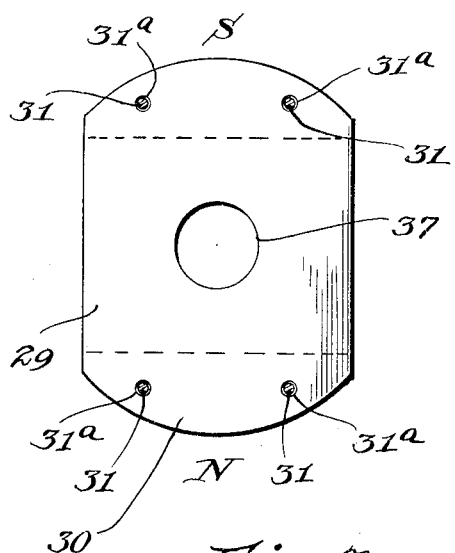
Figure 7 is an end view of the rotor shown in Figure 6.

Referring to Figure 1, the rotor shown therein comprises a plurality of punchings or plates 6 of magnetic material and having sufficient coercive force to insure retention of its magnetism. These punchings have a plurality of integral radial arms 7 spaced from one another and of a number depending upon the number of poles desired. As shown in Figures 1 and 2, these punchings have eight arms and are suitable for use in an 8-pole machine, although it is obvious that they may have two, four, six, eight or more poles.

Mounted on the end of each arm 7 is a pole piece 8 made up of thin magnetic laminations 9 assembled in stacked relation, threaded over the arms and held together and to the arms 7 in any suitable manner. As here shown, the arms 7 are reduced in cross-section near their ends so as to form shoulders 10 against which the laminations abut. The outermost lamination of each pole piece is held in place by arms 11 on magnetic supporting rings later to be described. The punchings may be magnetized so that the outer ends of arms 7 are alternately of north and south polarity, and the inner ends are magnetized oppositely to the outer ends in each case.

The rotor may be secured to a shaft 12 as by a key 13 coacting with a slot 14 cut in the punchings. If desired, the shaft 12 may carry a flange 12ª against which the rotor abuts. The punchings are held together by supporting rings 15; one of these rings being placed on either side of the rotor. These rings are of magnetic material and made up of alternate flat portions 16 and curved portions 17, the flat portions having integral hooks 11. Each ring has half as many of these curved portions as there are poles on the rotor, so that when assembled and secured to the punchings as by rivets 18, alternate arms 7 only are connected while the others are bridged. Hence, all poles of like polarity are connected together, and those of opposite polarity are bridged by curved portions 17. If the first ring 15 is secured to north poles, then the second ring on the other side of the rotor is connected to south poles, so that the two rings have their curved portions in staggered relation to each other. In this manner the punchings are held rigidly together and supported by the rings 15, and the pole pieces are held in place by arms 11, but the rings do not short circuit the flux from the poles.

The rotor shown in Figure 1 is adapted for cooperation with any suitable stator or armature. In Figure 2 a stator is indicated diagrammatically at 19 and it will be understood that this stator is supported in any suitable manner in close relation to the pole-pieces, and in bridging relation to opposite poles so as to conduct flux between them. Inasmuch as the particular type of stator is not a part of my invention, further explanation is thought to be unnecessary. Although I have described the rotor arms as being magnetized, this type of rotor may be employed in structures where this magnetization is not necessary.

In the modification shown in Figures 4 and 5, the magnetic punching 20 has two arms 21 and 22, and a central shaft opening 23. The punching is riveted to a supporting ring 24 by rivets 25 and the opening 23 is large enough to receive the shaft 12 and the punching and ring may be keyed to the shaft as at 26.

Secured to the ends of arms 21 and 22 are pole pieces 27 made up of stacked laminations of magnetic material, the laminations being secured together and to the arms in any suitable manner, as by rivets 28. In practice the arms 21 and 22 will be magnetized to opposite polarities, for example, arm 22 being a north pole and arm 21 a south pole. Preferably, this rotor is employed with a stator having its axis parallel to the shaft, thereby reducing the height of the machine and rendering it suitable for use where space is limited.

Figure 8:
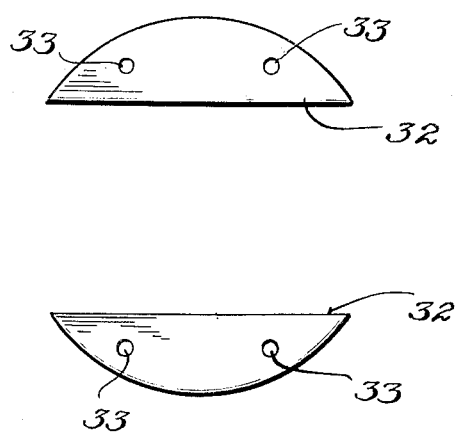
Figure 8 is a detail view of one of the laminations employed between the permanent magnets.

The rotor shown in Fig. 6 comprises a plurality of thin permanent magnets 29 having rounded ends 30, and adapted to be secured together by magnetic rods 31 passing through openings 31ª in these magnets. These magnets may be made of plates or punchings and contain openings 27. The magnets are preferably assembled in spaced relation, each two magnets having one or more magnetic laminations 32 holding them apart at each end. The laminations 32, as shown in Fig. 8, are half-moon shaped and contain openings 33 through which the assembly rods 31 pass. In this manner the like poles are held in spaced relation by laminations 32 but are magnetically connected so that these laminations function as pole pieces and facilitate proper flux distribution.

The manner of assembling the rotor will be clear from Fig. 6, wherein the magnets 29 are threaded over a shaft 34, the shaft passing through openings 37. As shown, each pair of adjacent magnets is separated at each end by two laminations 32, the magnets and laminations being held securely by rods 31 which pass through the openings 31ª and 37. These rods may be riveted at both ends or may consist of a bolt and nut. The magnet 29 at one end of the assembly abuts against a flange 35 on shaft 34, and the assembly is firmly held to the shaft by a nut 36 which may be threaded onto the shaft as shown.

It will be obvious that the magnetic field strength of this rotor may be varied by changing the number of punchings which are employed; also that the number of poles may be varied by employing punchings with a greater or a less number of arms than here shown. In the modification of Figure 5 the size of pole pieces 27 may be varied by changing the number of laminations employed, thereby altering the flux density.

Rotors embodying my invention are capable of use not only in magnetos, but will also find application in connection with dynamo-electric machines generally, where a simple and efficient construction is desired. One great advantage of such a structure is that the use of non-magnetic end plates is rendered unnecessary.

Although I have herein shown and described only a few forms of magnetic rotors, it will be obvious that various changes may be made in the details, within the scope of the appended claims without departing from the spirit and scope of my invention.

What I claim is:

1. A rotor for dynamo-electric machines comprising a plurality of punched magnetized plates assembled in stacked relation, each punching having a plurality of radial arms; a magnetic supporting ring secured to certain of said punchings and magnetically connecting alternate arms of said punchings; and a laminated pole piece on each of said arms.

2. A rotor for dynamo-electric machines and comprising a plurality of punched plates of magnetized material assembled in stacked relation, each punching having a plurality of radial arms, and a magnetic supporting ring secured on each side of said rotor, each ring having alternate flat and curved portions, the flat portions of one ring being attached to arms of one polarity and the curved portions being spaced from the arms of the opposite polarity, and the two rings being so placed that one connects the north poles and the other the south poles.

3. A magnetic rotor comprising magnetized plates having a plurality of radial arms of alternate north and south polarity, and a supporting ring of magnetic material, said ring being secured to all the arms of one polarity and having curved portions which are spaced from the arms of the other polarity.

THOMAS J. HARLEY.